United States Patent [19]

Farand

[11] Patent Number: 4,884,069

[45] Date of Patent: Nov. 28, 1989

[54] VIDEO APPARATUS EMPLOYING VRAMS

[75] Inventor: Tobin E. Farand, Mountain View, Calif.

[73] Assignee: Apple Computer, Inc., Cupertino, Calif.

[21] Appl. No.: 27,847

[22] Filed: Mar. 19, 1987

[51] Int. Cl.$^4$ ............................................. G06F 13/00
[52] U.S. Cl. ....................................... 340/799; 340/798
[58] Field of Search ............... 340/726, 747, 799, 750, 340/749, 724, 792, 725, 798, 800; 364/518, 521

[56] References Cited

U.S. PATENT DOCUMENTS

| | | | |
|---|---|---|---|
| 3,836,902 | 9/1974 | Okuda et al. | 340/799 |
| 3,974,493 | 8/1976 | Cavaignac et al. | 340/798 |
| 4,259,668 | 3/1981 | Nishimura et al. | 340/799 |
| 4,283,765 | 8/1981 | Rieger | 364/521 |
| 4,404,554 | 9/1983 | Tweedy et al. | 340/726 |
| 4,491,834 | 1/1985 | Oguchi | 340/726 |
| 4,685,070 | 8/1987 | Flinchbaugh | 340/747 |

FOREIGN PATENT DOCUMENTS

| | | |
|---|---|---|
| 0082746 | 12/1982 | European Pat. Off. . |
| 0150453 | 12/1984 | European Pat. Off. . |
| 0182454 | 7/1985 | European Pat. Off. . |
| 0189576 | 12/1985 | European Pat. Off. . |
| 0197413 | 3/1986 | European Pat. Off. . |
| 2155670 | 3/1984 | United Kingdom . |
| 2146811 | 9/1984 | United Kingdom . |

OTHER PUBLICATIONS

IBM Enhanced Graphics Adapter, Aug. 2, 1984, pp. 1–75.
IBM Technical Disclosure Bulletin, vol. 19, No. 2, Jul. 1976, pp. 548–550, New York, U.S.; W. J. Auen et al.: "Dynamic Image Alignment".

*Primary Examiner*—Alvin Oberley
*Attorney, Agent, or Firm*—Blakely, Sokoloff, Taylor and Zafman

[57] ABSTRACT

A video card using VRAMs for a computer which includes a CPU and main memory. The VRAM addresses are generated in a manner making it unnecessary to have an integer number of scan lines per memory row. A counter keeps track of the shift register position in the VRAMs and a new row address is generated in hardware independent of the scan line. A look-ahead feature detects the approaching end of the shift register data and initiates a timing sequence to reload the shift register.

12 Claims, 5 Drawing Sheets

VIDEO APPARATUS EMPLOYING VRAMS

BACKGROUND OF THE INVENTION

1. Field of the Invention

The invention relates to the field of frame buffers for video displays and more particular, to addressing mechanisms for frame buffers.

2. Prior Art

Video random-access memories (VRAMs) have become commercially available in recent years for use with video displays. These devices include a memory array for storing pixel data and a shift register both formed on the same substrate. A row address is used to transfer data to the shift register. A column address is then used to identify a starting location in the shift register from which data is read out. Shift register operations can occur asynchronously with array accesses. Typically, the data is shifted out of the shift register at a much faster rate than that associated with dynamic RAM accessing.

In many applications, there is an integer number of scan lines displayed per row line in the memory. That is, a shift integer is not emptied midway in a scan line. There are timing and other problems if this correlation is not maintained.

The present invention provides circuitry for addressing the VRAMs while allowing a non-integer or integer number of scan lines per row of video memory. Among the features provided by the present invention is a lookahead mechanism used to initiate a memory cycle before the shift register is emptied. This permits the shift register to become empty in the middle of a scan line and to be reloaded in time to continue the scan.

SUMMARY OF THE INVENTION

A video apparatus (sometimes hereinafter referred to as the video section or video card) for providing video data from an array of VRAMs for a display for a computer is described. An interface means is used for interfacing between the video section and the central processing unit (CPU) of the computer. The pixel data stored in the VRAMs is addressed by an address generator which is coupled between the interface means and the VRAMs. The address generator includes a row address storage means and column address storage means which store a row and column address, respectively. A column counter is coupled to receive the column address and is clocked in synchronous with the pixel clock rate (more specifically, at the rate data is shifted from the shift register of the VRAMs). A row address counter is coupled to receive the row address. The addressing means includes a control means which causes the row counter to increment when the column counter reaches a predetermined count (e.g., 256 where the shift register has 256 stages). As this occurs the column count is returned to zero, allowing the next full row in the VRAM array to be used for the display.

Additionally, in the preferred embodiment a signal is generated before the shift register is emptied. This signal is generated by keeping track of the amount of pixel data remaining in the shift register. This lookahead feature is used to initate a time sequence for data transfer from the memory locations of the VRAMs into the VRAM shift registers.

Other features of the present invention such as the video section's compatibility with two different buses are described in more detail in the following description.

DETAILED DESCRIPTION OF THE INVENTION

A video apparatus having an array of VRAMs for use in a computer which computer includes a central processing unit (CPU) and main memory is described. In the following description, numerous specific details are set forth such as specific number of bits, etc., in order to provide a thorough understanding of the present invention. It will be obvious, however, to one skilled in the art that the present invention may be practiced without these details. In other instances, well-known circuits and timing has not been described in detail in order not to unnecessarily obscure the invention.

OVERVIEW OF THE COMPUTER

Figure 1:
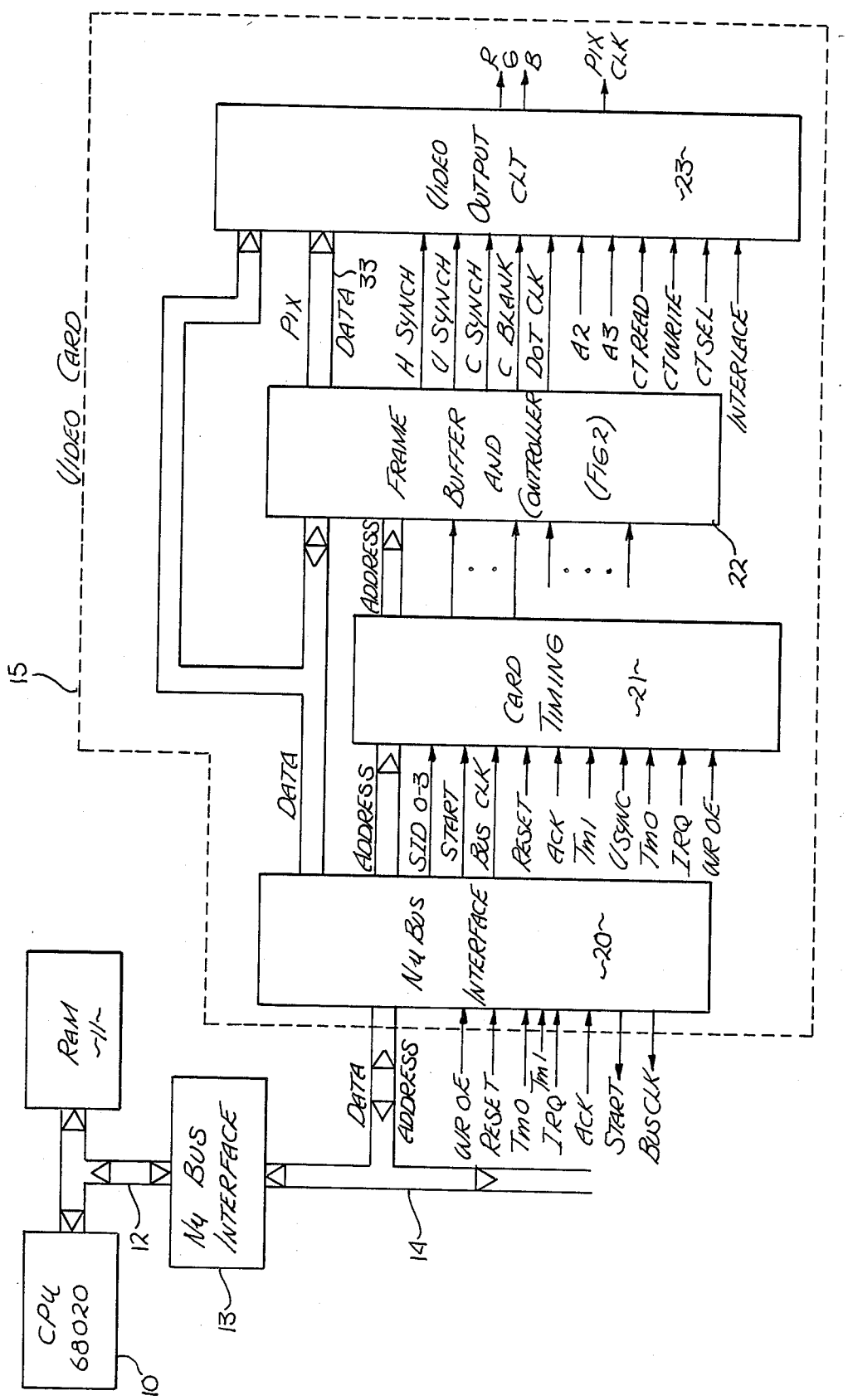
FIG. 1 is a block diagram of the video section (video card) embodying the present invention in its presently preferred embodiment and also illustrates the card's coupling to a computer through a NuBus interface circuit.

The video apparatus of the present invention is realized as a video card which is inserted into the motherboard of a computer. The computer, as shown in FIG. 1, includes a CPU 10 which is a commercially available 68020 microprocessor. The CPU communicates with a main memory, RAM 11, over a bus 12. The bus 12 is a standard bus structure using the protocol associated with the 68020 microprocessor. For instance, the address and data signals are transferred over separate lines, that is, they are not multiplexed over common lines. The computer includes a plurality of slots into which cards are inserted. These slots are coupled to a NUBUS bus 14 ("NUBUS" is a trademark of Texas Instruments Incorporated). The NUBUS interface circuit 13 provides the interface between the 68020 bus 12 and NUBUS. (By way of example, the interface circuit 13 includes multiplexing/demultiplexing means since on the NUBUS the data and address signals are multiplexed.) The video card 15, as mentioned, engages one of the slots in the computer and communicates with the NUBUS 14. The outputs from the card 15 include the standard red, green, blue (RGB) signals which are coupled to a video monitor to provide a color display.

Numerous circuits associated with the computer of the Figures such as a ROM which stores systems programs are not illustrated. Other aspects of the computer are disclosed in copending applications entitled MEMORY MAPPING UNIT, Ser. No. 015,907, Filed 2/18/87, U.S. Pat. No. 4,774,652; A COMPUTER WITH EXPANSION SLOTS FOR CARDS, Ser. No. 025,499, Filed 3/13/87; CARD FOR COMPUTER WITH EXPANSION SLOTS, Ser. No. 025,500, Filed 3/13/87; METHOD AND APPARATUS FOR DETERMINING AVAILABLE MEMORY SIZE, Ser. No. 027,005, Filed 3/17/87, now abandoned, all assigned to the assignee of the present invention.

The computer of FIG. 1 with its slots provides an "open architecture" version of the Apple Macintosh computer. Moreover, the 68020 provides enhanced processing capabilities over earlier versions of this computer. The video card 15 provides a color video signal as opposed to the non-color video on the earlier versions of this computer.

VIDEO CARD

The major elements of the video card 15 shown in FIG. 1 are the NUBUS interface circuit 20, card timing circuit 21, frame buffer and controller 22 and the video output circuit 23. The present application focuses mainly on the frame buffer and controller 22 since the present invention for the most part resides there. The circuits 20, 21 and 23 are discussed only in general terms, mainly to show the environment in which the present invention is used.

The NUBUS interface circuit 20 provides interface between the computer NUBUS 14 and the video card 15. The data and address signals are buffered within the circuit 20. Well-known timing signals and control signals associated with the NUBUS are also coupled to the card through the circuit 20. These are shown as the write output enable (WROE), Reset, TM0 and TM1, interrupt request (IRQ), acknowledge, Start and Bus CLK. The output from circuit 20 includes separate data and address buses. The data bus is coupled both to the frame buffer and controller 22 and the video output circuit 23. The address bus is coupled through the card timing circuit 21 to the frame buffer and controller 22. The NUBUS interface circuit 20 is constructed using well-known components and its construction is not critical to the present invention.

The card timing circuit 21 performs card level timing. The video timing used with the present invention is generated within the frame buffer and controller 22 and is described later in the application. This card level timing is not unique to the present invention and well-known timing circuits may be used. The card timing circuit 21 receives the slot identification lines for use in a decoder to generate a select signal. Other signals received by this circuit 21 include: Start, Bus CLK, Reset, ACK, TM0, TM1, IRQ, vertical synchronization (VSYNC) and WROE. In its currently preferred embodiment, the card timing circuit is fabricated from three programmable array logic integrated circuits. Also included as part of circuit 21 is a configuration ROM which provides configuration information for the video card.

Figure 2:
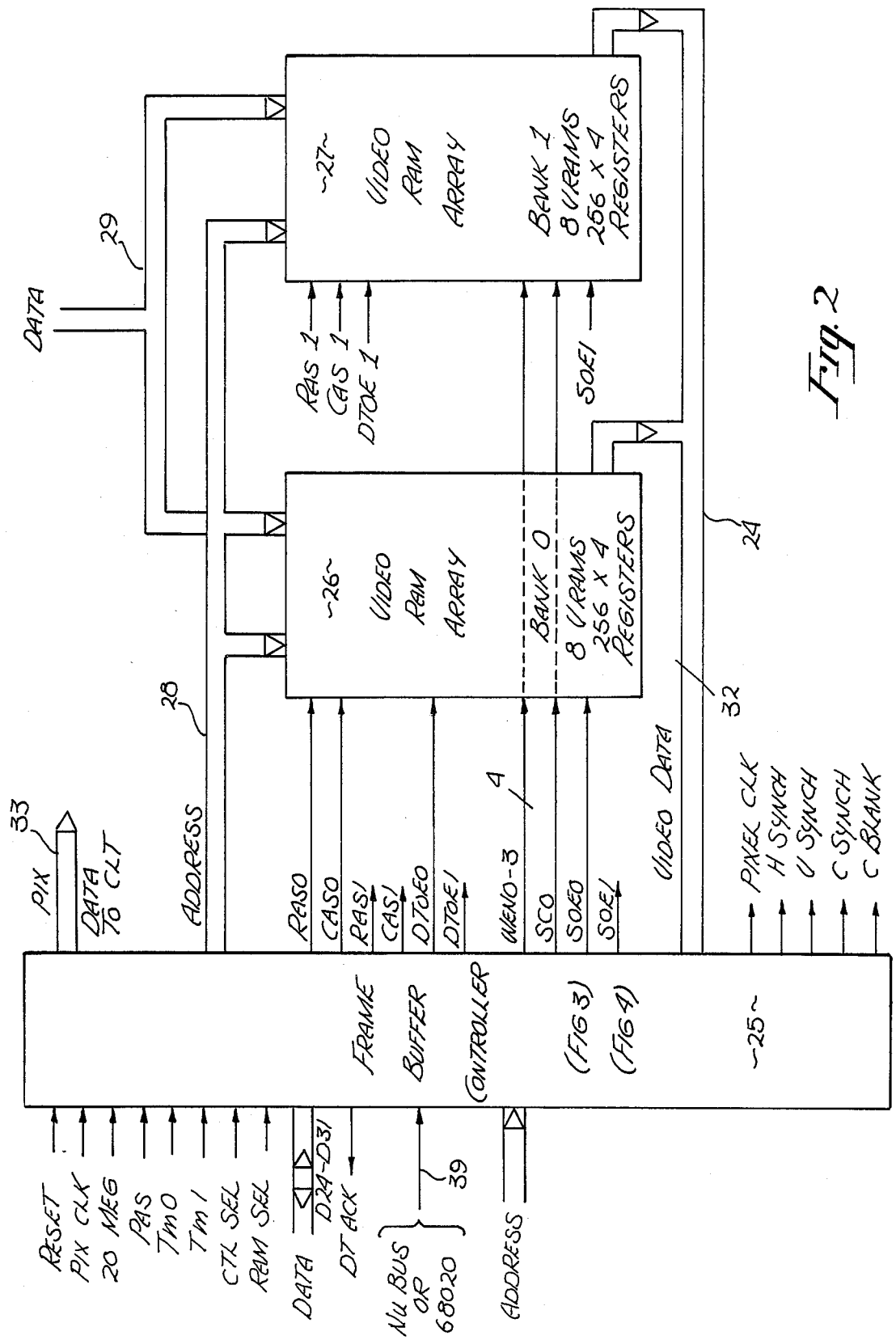
FIG. 2 is a block diagram of the frame buffer and controller of FIG. 1.

The frame buffer and controller 22 is described in detail beginning with FIG. 2. In general, it provides the video timing and RAM timing for the video RAMs, memory control, RAM address generation and digital pixel data generation. Specific inputs to the frame buffer and controller 22 are set forth in subsequent figures.

The video output circuit 23 includes a color lookup table (CLT). Such tables are well-known in the art and, for instance, receive a code (e.g., 8 bits of pixel data) and provide a digital signal representing a predetermined color, for example, 8 bits representing red, 8 bits representing green, and 8 bits representing blue. These digital signals are then converted to analog signals and used to drive a color monitor. These color lookup tables are in some case ROMs. The particular CLT used in circuit 23 is a RAM which is written into the data bus.

OVERVIEW OF THE FRAME BUFFER AND CONTROLLER

As shown in FIG. 2, the frame buffer and controller includes the controller 25 and two banks of RAM, RAM array 26 (bank 0) and RAM array 27 (bank 1). The arrays 26 and 27 store the pixel data for the display and this data is sent to the color lookup table at the pixel clock rate (up to 8 bits in parallel) over bus 33. As currently implemented, the display comprises 640×480 pixels with a pixel clock rate of 30.24 mHz. The pixel data is read from the arrays through bus 24 (32 bits from the selected array) and then clocked out on bus 33 at either 1, 2, 4 or 8 bits per pixel. The data is loaded into the arrays directly from the data bus 29. The addresses for the arrays are generated within the controller 25 and coupled to the arrays via the bus 28.

Figure 3:
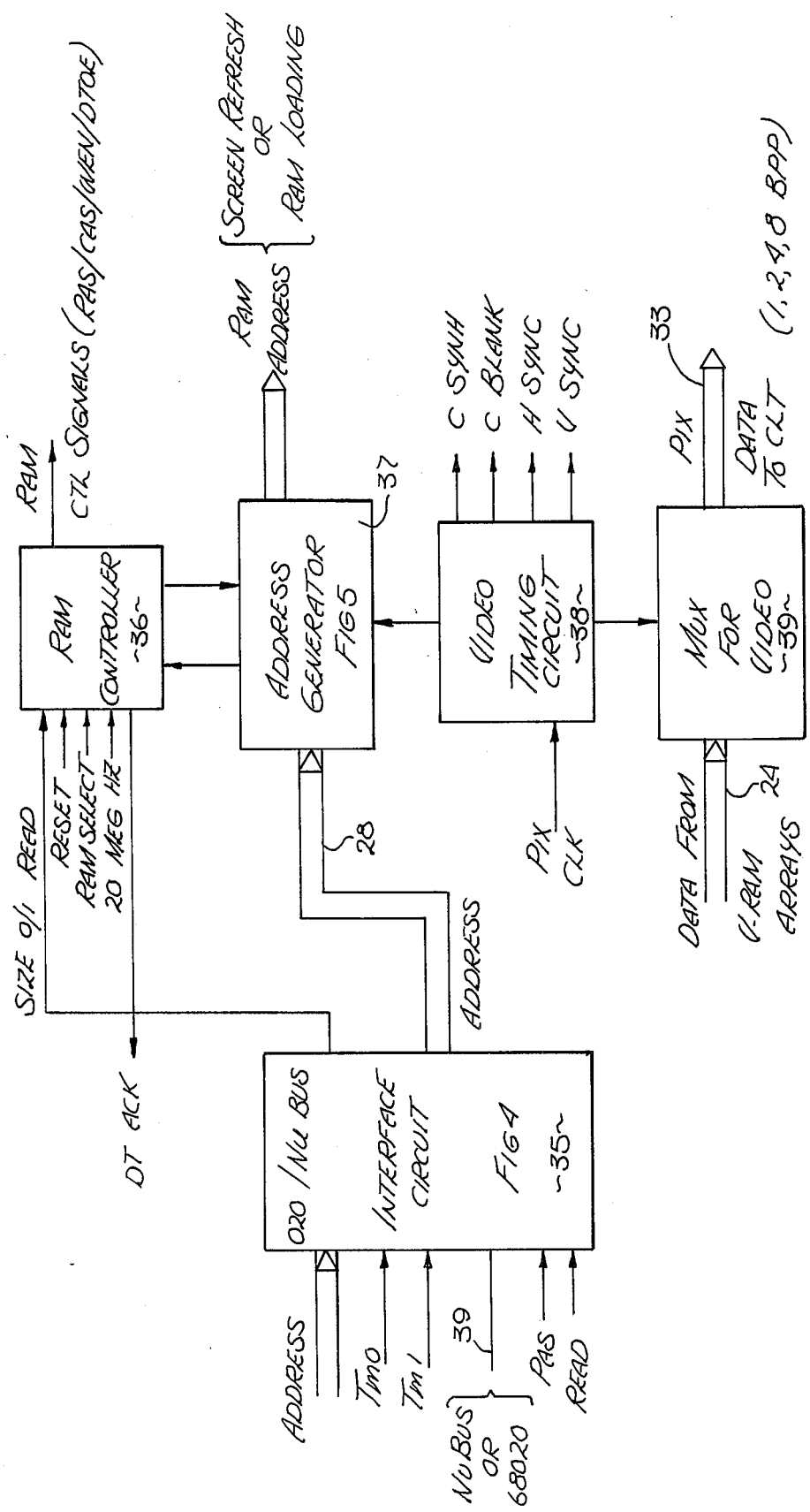
FIG. 3 is a partial block diagram of the controller of FIG. 2.
Figure 4:
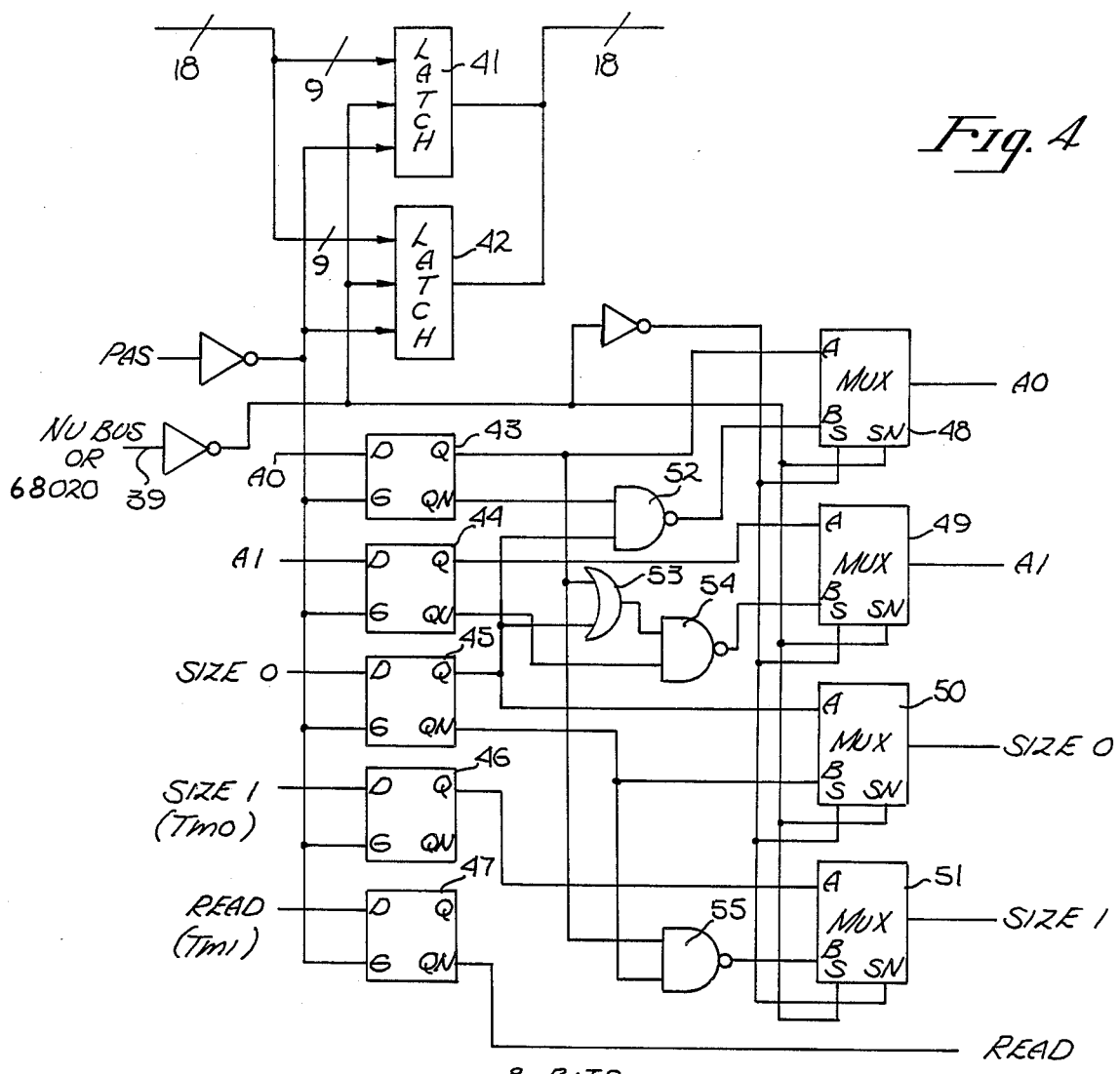
FIG. 4 is a circuit diagram of a portion of the bus interface circuit of FIG. 3.

The frame buffer controller 25 is described in more detail in conjunction with FIGS. 3 and 4. The controller receives a reset signal, the pixel clock (PIX CLK), a 20 mHz timing signal, a physical address strobe (PAS), the TM0 and TM1 signals, a control select signal and a RAM select signal. The data lines D24–D31 are coupled to the controller and are used to load control registers. A data acknowledge signal (DT ACK) is provided by the controller as part of the data transfer protocol. As will be described in detail in conjunction with FIG. 4, the controller permits interfacing with either the NUBUS or a 68020 bus. The signal on line 34 indicates which of the two buses are coupled to the controller. (As currently employed and shown, the NUBUS is used.) The controller 25 also receives a 19 bit address field (one for bank select).

In addition to the pixel data output and addresses, the controller provides the control signals for the arrays 26 and 27. Standard row address strobe (RAS) signals and column address strobe (CAS) signals are provided for both arrays. RAS0 indicates the row address strobe for bank 0 and RAS1 is used to indicate the row address strobe for bank 1. Similar "0" and "1" designations are used for other control signals. The DTOE0 and DTOE1 signals are standard video RAM signals (data transfer output enable) which cause the loading of the shift register in the video RAM). The WEN0-3 lines (4 lines) are coupled to both arrays for byte lane selection when data is read into the arrays from the bus 29. SC0 is the serial clock signal which is coupled to both arrays. SOE0 and SOE1 are the serial output enables, one for each of the banks.

Additionally, the controller provides standard timing signals, specifically, the pixel clock, horizontal synchronization (H SYNCH), vertical synchronization (V SYNCH), composite synchronization (C SYNCH), and composite blanking (C BLANK).

Each array in the currently preferred embodiment comprises 8 commercially available video RAMs, specifically NEC Part. No. 41264. Each of these "chips" includes an array organization of 256 rows (1K bits per row) and a shift register with 256 stages (4 bits per stage). Therefore, each 16-bit address (8 row address signals and 8 column address signals multiplexed on bus 28) selects one of the rows in each of the video RAMs and allows the transfer of 256×4 bits into the shift register of each RAM. The SOE0 and SOE1 signals permits the selection of either array 26 or 27, and each array is thus able to couple 32 bits of data onto bus 24 since there are eight 256×4 registers within each array.

CONTROLLER

In FIG. 3, the major elements of the controller 25 are illustrated as interface circuit 35, RAM controller 36, address generator 37, video timing circuit 38 and multiplexer for video 39. Certain of the signals coupled to the controller 25 of FIG. 2 are coupled to the interface circuit 35 of FIG. 3. The interface circuit 35 of FIG. 3 is different and not part of the interface circuit 20 of FIG. 1. The latter provides interface between the video card and the NUBUS. The interface circuit 35 on the other hand accepts signals either from the NUBUS or directly from a 68020 bus and provides control signals which are used by the controller and buffer. The circuit 35 will be described in detail in conjunction with FIG. 4.

The RAM controller 36 receives the size 0, size 1 and read signals from the circuit 35 in addition to other inputs to the controller, specifically reset, RAM select and the 20 mHz clock signal. The controller provides the ordinary control signals for the RAM, mainly the RAS, CAS, WEN, DTOE, etc., signals. It also provides a data acknowledge signal for the NUBUS or 68020 handshake. The size 0 and size 1 signals determine which byte lane(s) of the 32-bit data bus is(are) being used. Controller 36 also controls the refreshing of the VRAMs. The RAM controller 36 employs ordinary circuits, not critical to the present invention.

Figure 6:
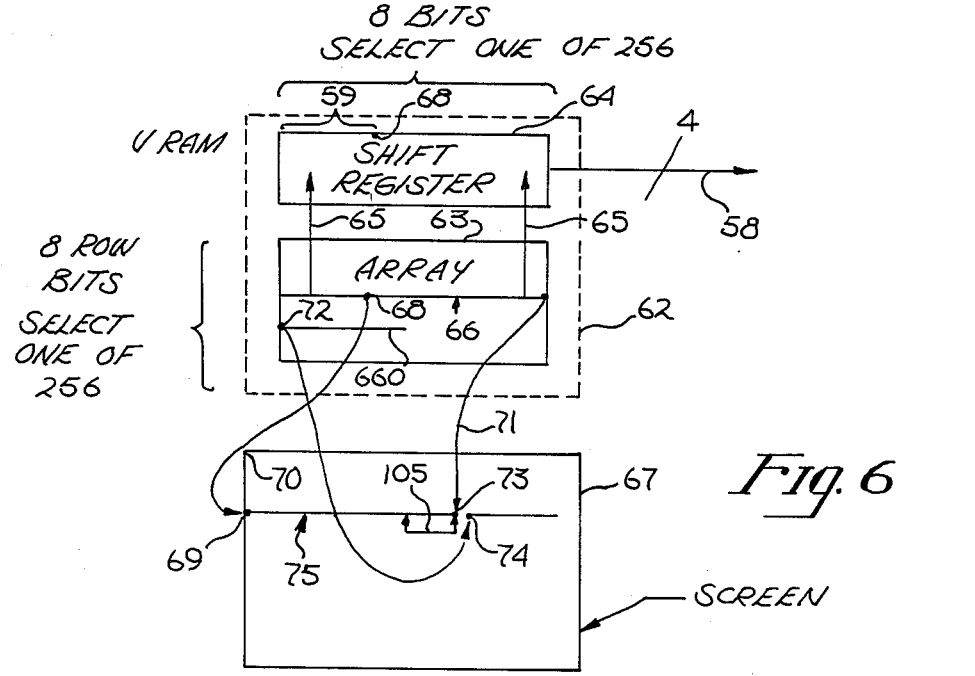
FIG. 6 is a diagram used to explain the operation of the address generation means of FIG. 5.
Figure 5:
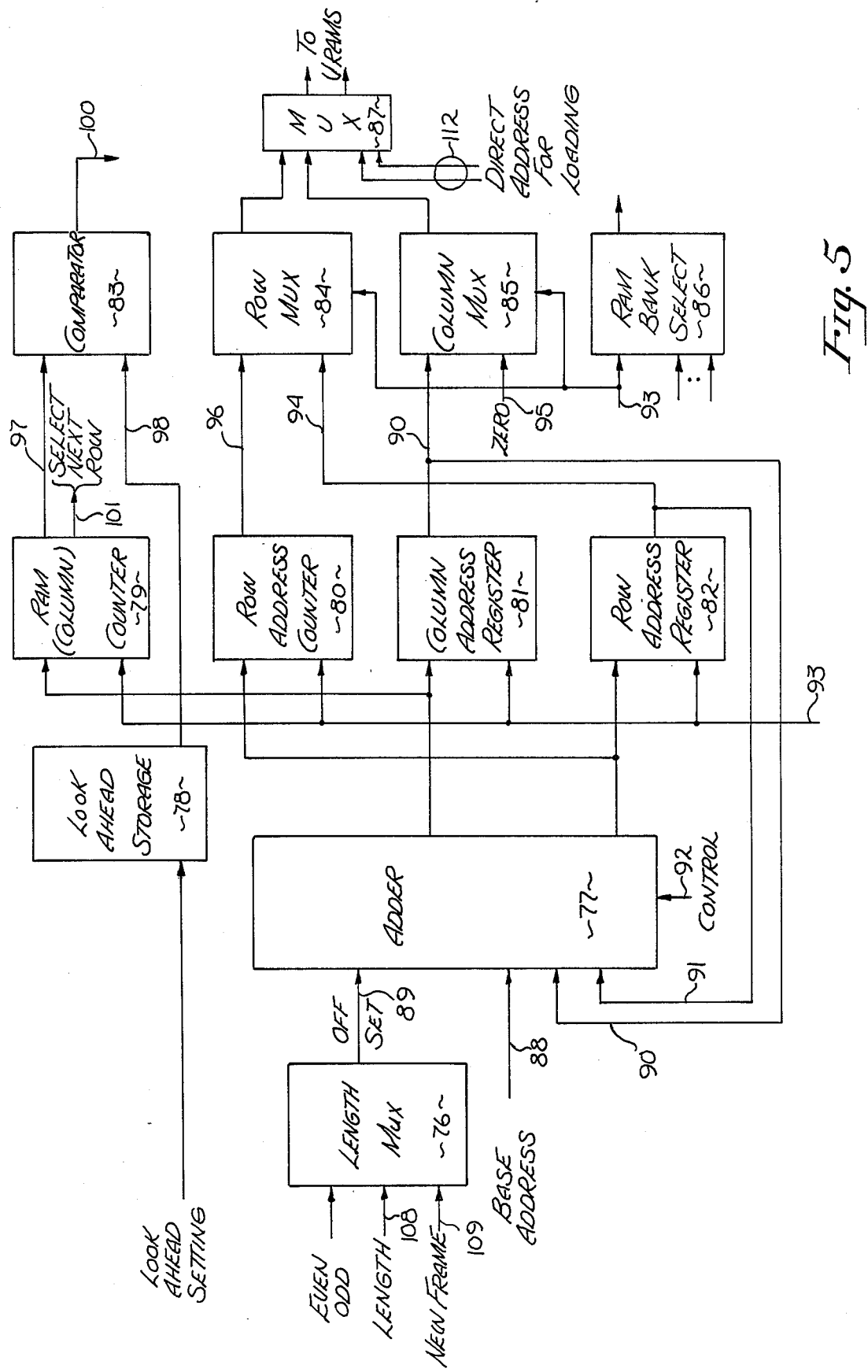
FIG. 5 is a detailed block diagram of the address generation means used in the presently preferred embodiment of the invention.

The address generator 37 is described in conjunction with FIGS. 5 and 6.

The video timing circuit 38 receives the pixel clock and generates composite synchronization and blanking signals, and the horizontal and vertical synchronization signals. The timing circuit also provides timing signals to the generator 37 and to the multiplexer 39. The timing circuit 38 is fabricated employing well-known circuits.

The multiplexer 39 receives the 32-bit of data from the RAM arrays on bus 24 and couples the video data onto the pixel data bus 33. The data is coupled either at 1, 2, 4 or 8 bits per pixel depending on the mode selected.

NUBUS/68020 INTERFACE CIRCUIT

Referring now to FIG. 4, the interface circuit includes latches 41 and 42. These latches receive 18 lines of the address bus. The latching is controlled by the physical address strobe (PAS). The NUBUS or 68020 select signal on line 39 controls polarity of outputs from the circuit of FIG. 4 (NUBUS and 68020 have opposite polarity standards). Thus, the signal on line 39 is coupled to latches 41 and 42 to control output polarity on line 18 and similarly, the signal on line 39 is coupled to the multiplexers 48–51 for the same purpose. (The polarity of the read signal is not changed.)

The latch 43 receives the A0 signal, latch 44 the A1 signal, latch 45 the size 0 signal, latch 46 the size 1 signal and latch 47 the read signal. The output of latch 43 is coupled to multiplexer 48 and as is apparent when the A terminal of multiplexer 48 is selected, the A0 signal appears at the output of latch 48. The QN output from latch 43 and the Q output from latch 45 are coupled to the NAND gate 52 and provide the B input to multiplexer 48. The Q output of latch 44 is coupled to the A input of multiplexer 49 and hence, when the A input of multiplexer 49 is selected, the A1 signal appears at the output of this multiplexer. The Q output of latch 45 and the Q output of latch 43 are coupled through the OR gate 53 and provide one input to the NAND gate 54. The QN output from latch 44 provides the other input to NAND gate 54. The output of NAND gate 54 is coupled to the B input of the multiplexer 49. Multiplexer 50 receives the Q output of latch 45 at its A input terminal and hence, the size 0 signal is coupled to the output of multiplexer 50 when input A is selected. The B terminal of this multiplexer receives the QN output of latch 45. The multiplexer 51 receives the Q output of latch 46 (size 1 signal) which again is coupled to the output of multiplexer 51 when the A terminal is selected. The B input terminal of multiplexer 51 is coupled to the output of the NAND gate 55. The inputs to this NAND gate are the QN output of latch 45 and the Q output of latch 43. The read signal is coupled directly through latch 47.

To understand the operation of the circuit of FIG. 4, it should first be understood that the major control signals from the 68020 bus are: read, size 0, size 1, A0, A1 and PAS. The data and address signals are not multiplexed. For the NUBUS, the major control signals are: TM0, TM1, A0, A1, Start, with the address and data being multiplexed and inverted. The size 0 and size 1 signals indicate the size of the data transferred, that is, 8, 16, 32, 24, or 32 bit wide transfer on the 32-bit bus. The A0 and A1 signals indicate where on the bus the transfer is to occur, that is, for example, an 8-bit transfer may occur on lines D7–D15. However, the NUBUS does not support a 3 byte transfer, therefore, size 0 (input to latch 45) is high at all times when the signals applied to the circuit of FIG. 1 are NUBUS signals.

A0, A1, size 0, size 1 and Read as shown in FIG. 4 are the designations for 68020 compatible signals which when used are directly coupled through the circuit and appear at the output of the multiplexers (except for Read). When the input to the circuit of FIG. 4 is coupled from a NUBUS, the equations which follow are implemented by the circuit of FIG. 4 (the TM1 signal is interpreted as a Read signal). The "x" in the following equations indicate an output from the multiplexers.

$X A0 = \overline{A0} \cdot Size\ 0$ $X A1 = A0 + Size\ 0 \cdot \overline{A1}$ $X\ Size\ 0 = Size\ 0$ $X\ Size\ 1 = \overline{A0 \cdot Size\ 0}$ The implementation of the above equations translates the NUBUS control signals into the same signals that would be sensed at the output of the interface circuit if that circuit were directly coupled to the 68020 bus.

VRAM ADDRESS GENERATOR

Before describing the address generator, it will be helpful to examine a VRAM and its addressing mechanism. In FIG. 6, a VRAM 62 is illustrated having a memory array 63 and a shift register 64. This VRAM is one of the plurality of VRAMs which form the RAM arrays 26 and 27 of FIG. 2. As mentioned, an 8-bit row address coupled to the VRAMs selects a row of data such as row 66 of array 63. This data is shifted into the shift register 64 as indicated by lines 65. The column address applied to the RAM 64 selects the starting location at which data from the shift register 64 is shifted from the shift register onto the output line 58 (4 bits at a time). For example, the column address may select a location corresponding to column 68 along the row 66; then the first data appearing on line 58 is data stored at location 68. As the shift register shifts, the data represented by the brackets 59 is shifted from the register 64.

Referring now to FIG. 5, the address generator includes a multiplexer 76. This multiplexer receives a signal which indicates whether a particular frame comprises odd or even lines of an interlaced display. A second signal coupled to the MUX 76 on lines 108 provides a digital number representing the length of the digital data required for each scan line pair (even and odd line) of the display As mentioned, the currently preferred embodiment can use 1; 2, 4, or 8 bits per pixel, therefore, this length is not fixed. (Different programs may, through software, select different lengths.) Obviously, if one bit per pixel is used, substantially less data and hence, substantially less memory space is used to store the pixel data for each scan line. The signal on line 109 indicates when a new frame begins and is used, as will be described, to control the selection at the offset at the output of the multiplexer 76 (lines 89). The length multiplexer 76 includes circuits which allows the output on lines 89 to be zero, the number on lines 108 or one-half the number on lines 108 (the purposes of which will be described).

The adder 77 is an ordinary digital adder which adds the offset on lines 89 to either the base address on lines 88 or to the address on lines 90 and 91. Control signals on lines 92 for each new frame cause the signals on lines 88 to be added to zero or ½ the number on lines 108, depending on whether an odd or even frame is being displayed. Thereafter, (for the remainder of the frame) the digital number on lines 89 are added to the digital numbers on lines 90 and 91. The output of the adder which is a VRAM memory address includes a row field and a column field (8 bits each) which are coupled to registers 81 and 82. The row address is also coupled to the row address counter 80 and similarly the column address is also coupled to the RAM (column) counter 79.

The row multiplexer 84 selects between the output of the row address counter 80 (lines 96) and the row address register 82 (lines 94). At the beginning of each frame, multiplexer 84 selects the output of register 82. When the shift register associated with the VRAMs reaches its end, the address on lines 96 is selected. The counter 80 increments (by 1) the address that is stored in registers 2 each time the shift register reaches its end.

The column multiplexer 85 selects between the contents of register 81 and a zero address on lines 95. At the beginning of each scan line, the address from register 81 is selected. This address which is also coupled into the counter 79 is incremented at the rate data is shifted in the shift registers of the VRAMs. (This is slower than the pixel clock rate since there are 32 bits from the VRAM for each count in counter 79.) When the counter 79 reaches a predetermined count (e.g., 256) an output signal occurs on line 101. This signal causes the multiplexer 84 to select lines 96 and the multiplexer 85 to select the zero address.

Lines 93 provide the timing signals and control signals to implement the counting and the address transfers described below.

The comparator 83 compares the count within the counter 79 with a digital number stored within the lookahead storage means 78. The contents of the counter are coupled to the comparator 83 via lines 97 and the contents of the storage means 78 are coupled to the comparator 83 via lines 98. When the count in counter 79 matches the number stored in the storage means 78, a signal occurs at the output of the comparator 83 on line 100. In the currently preferred embodiment, the lookahead storage means 78 stores a digital number which can be changed (typically by software).

The multiplexer 87 selects between the output of multiplexers 84 and 85, and lines 112. The address on lines 112 are received via the NUBUS from CPU. They are used to load the video RAMs in an ordinary manner. The addresses from the multiplexers 84 and 85 are the addresses used during scanning (screen refresh).

RAM bank select 86 receives additional information and decodes it in an ordinary manner to select between bank zero and bank one of the memory arrays. For purposes of the following discussion, the particular bank selected is not critical.

OPERATION OF THE ADDRESS GENERATOR

Assume now that the VRAM arrays contain pixel data for the display. (This data, as mentioned, is received on the data bus 29 with addresses from lines 112 which are then coupled to the VRAMs through the bus 28 of FIG. 2. The CPU provides a base address which corresponds, by way of example, to the location for data for the upper lefthand corner 70 of the display 67 of FIG. 6. This address need not correspond to the beginning of a row line in memory; that is, there can be a column address so that data for pixel 70 begins midway in the shift register. This base address is coupled on lines 88 to the adder 77. Since this is a new frame (assume odd lines) zero is coupled on lines 89 to the adder. The output from the adder 77 comprises the base address which is coupled to registers 81 and 82 and also loaded into counters 79 and 80. The multiplexers 84 and 85 select this address and it is coupled to the VRAMs. As the data is clocked from the shift register (e.g., shift register 64 of FIG. 6) the counter 79 is incremented. Data words of 32 bits are coupled from the VRAM with each shifting of the shift registers. If 8 bits per pixel are used, then counter 79 is incremented at one-fourth the pixel clock rate. Similarly, if one bit per pixel is used, the counter 79 is incremented at 1/32 the rate of the pixel clock. (In fact, the shift register can operate synchronously from the pixel clock so long as data is accessed at a rate fast enough to meet the demands of the display mode. Temporary storage or buffers may then be necessary.)

When the counter 79 reaches the predetermined count (e.g., 256), the last stages of the shift register is being accessed. The signal on line 101 causes the row multiplexer 84 to select the address on lines 96. For the example, this is the base row address incremented by one; that is, the next row in memory. Also, the signal on line 101 causes the multiplexer 85 to select lines 95 and the first stages of the shift register is selected. Additionally, counter 79 is reset (zero count).

For each scan line thereafter, the row address from row address register 82 and the column address from register 81 are added to the offset on lines 89. The new address is then coupled to registers 81 and 82 and selected by multiplexers 84 and 85.

When odd scan lines are displayed, the offset 89 is added to the base address after the first line as described above (except for scan line 1 where base address is used). That is, for scan line 3, the address on lines 90 and 91 (which is the base address) is added to the offset to obtain the next line. For line 5, the offset is added to the address on lines 90 and 91 which corresponds to scan line 3, thereby providing the starting address for scan line 5, etc.

For even scan lines, the location in the VRAM for scan line 2 must be addressed at the start of the frame. Here one-half the length on lines 108 is added to the base address on lines 88 to obtain the address for scan line 2. This address from lines 90 and 91 is added to the full length (offset on line 89) to provide the address for scan line 4 and the remaining scan lines in the frame.

Thus, to summarize for odd lines the offset is initially zero, whereas for even scan lines, the offset is initially one-half the length. It will be apparent that for non-interlaced displays the even-odd signal is not required and the length on lines 108 corresponds to the length of data between consecutive scan lines on the display.

Referring now to FIG. 6, the importance of the address generation of FIG. 5 can be more readily appreciated. Assume that scan line 75 of display 67 is being scanned. Further assume that the address coupled to registers 81 and 82 correspond to row 66 of the array 63 and column location 68. This entire row is transferred into the shift register and the first data from the shift register corresponding to the column location 68. This provides the pixel data for pixel 69 of scan line 75. As the data is shifted from the shift register 64, it is used through, of course, the color lookup table to provide the video signal as needed to paint line 75. The counter 79 is incremented; for this case the number of counts needed to reach 256 corresponding to bracket 59. When the end of the shift register is reached, data is loaded from the next row in the array shown as row 660 (this address is from counter 80). Now the column address is zero, selected by multiplexer 85 from lines 95. The data at location 72 provides the pixel data for pixel 74 of line 75.

Thus, the data for pixel 73 came from the end of row 66 as indicated by line 71. The data for the next pixel 74 came from the next row (row 660) but from the beginning of the shift register (column 72). The significance of this is that the storage of the data within the array 63 is not necessarily mapped with a fixed number of rows corresponding to a fixed number of scan lines. This allows the data to be more efficiently stored within array 63.

Memory cycle time is required to address a row and transfer data from the row into the shift register. This is a relatively long time when compared to the pixel rate. The present invention provides a lookahead feature to alert the system to the fact that the end of the data in the shift register is approaching. The line 105 of display 67 is used to illustrate that before the data for pixel 73 is reached a lookahead mechanism is activated.

The lookahead mechanism employs the lookahead storage 78 of FIG. 5. This number is stored, as mentioned, and compared with the contents of counter 79. Before the end of the shift register is reached, a signal occurs on line 100. This signal is used as a RAM control signal for the start of a time sequence to transfer data into the shift register. (The DTOE signal can be asserted while data is being shifted out of the shift register to permit rapid transfer of data from the next row into the shift register.) This provides a smooth transition of data from row-to-row of the memory array. The lookahead 105 of FIG. 6 is programmable, that is, a longer lookahead is used where more pixel data is needed (e.g., 8 bits per pixel) and a shorter time is used where less pixel data is needed (e.g., 1 bit per pixel).

In the currently preferred embodiment, comparator 83 examines the six most significant bits of the counter 79 and storage means 80 is programmable from 3 to 6 bits.

Thus, an address generator has been described which makes very efficient use of video RAMs and permits the pixel data to be stored in the video RAMs without having an integer number of scan lines per row of memory.

I claim:

1. A video apparatus for providing video data for a display when coupled to a computer which includes a central processing unit comprising:
   interface means for interfacing with said central processing unit;
   a pixel data memory having a plurality of video random-access memories each of which includes a storage array and a shift register;
   addressing means for addressing said video random-access memories coupled between said interface means and said pixel data memory comprising:
   (a) row address storage means for storing a row address;
   (b) column address storage means for storing a column address;
   (c) row counter means for incrementing said row addresses;
   (d) column counter means for receiving said column addresses;
   (e) control means for selecting said row counter means when said column counter reaches a predetermined count, said control means resetting said column counter means when said row counter means is incremented;
   (f) comparator means for comparing the count in said column counter means with a certain count which is less than said predetermined count so as to provide a signal before said shift registers are emptied, said signal causing new address signals to be generated for said video random-access memories;
   said pixel data memory being accessed by said addressing means to provide video data for said display.

2. The video apparatus defined by claim 1 including an adder coupled to receive a control input, a base address, an offset and the outputs of said storage means, the output of said adder being coupled to said storage means.

3. The video apparatus defined by claim 2 wherein the outputs of said row and column address storage means are added to said offset for new scan lines of said display.

4. The apparatus defined by claim 3 wherein said certain count, is programmable.

5. A video apparatus for providing video data for a display when coupled to a computer which includes a 68020 central processing unit and a main memory, said computer including a NUBUS which communicates with said central processing unit and said main memory, comprising:
   interface means for selectively interfacing with each of said NUBUS or said 68020 central processing unit;

a pixel data memory having a plurality of video random-access memories each of which includes a storage array and a shift register;

addressing means for addressing said video random-access memories coupled between said interface means and said pixel data memory comprising:
  (a) row address storage means for storing a row address;
  (b) column address storage means for storing a column address;
  (c) a row counter coupled to receive said row address;
  (d) a column counter coupled to receive said column address;
  (e) control means for causing said row counter to increment when said column counter reaches a predetermined count;
  (f) comparator means for comparing the count in said column counter with a certain count which is less than said predetermined count so as to provide a signal before the shift registers in said video random-access memories are emptied, said signal causing new address signals to be generated for said video random-access memories:

said pixel data memory being accessed by said addressing means to provide video data for said display.

6. The apparatus defined by claim 5 wherein said certain count is programmable.

7. A video apparatus for providing video data for a display when coupled to a computer which includes a central processing unit and a main memory comprising:

interface means for interfacing with said central processing unit;

a pixel data memory having a plurality of video random-access memories each of which includes a storage array and a shift register;

addressing means for addressing said video random-access memories coupled between said interface means and said pixel data memory comprising:
  (a) an adder for receiving a base address and an offset;
  (b) row address storage means for storing a row address received from said adder;
  (c) column address storage means for storing a column address received from said adder, wherein the outputs of said row and column storage means provide an additional input to said adder;
  (d) a row counter coupled to receive said row address;
  (e) a column counter coupled to receive said column address, and clocked at the rate data is shifted from the shift register of said video random-access memories;
  (f) control means for causing said row counter to increment when said column counter reaches a predetermined count, said control means resetting said column counter when said row counter is incremented;
  (g) comparator means for comparing the count in said column counter with a certain count which is less than said predetermined count so as to provide a signal before the shift registers in said video random-access memories are emptied, said signal causing said new address signals to be generated for said video random-access memories;

said pixel data memory being accessed by said addressing means to provide video data for said display.

8. The apparatus defined by claim 7 wherein said row and column address storage means receive said base address from said adder for a certain new frame of said display and for subsequent scan lines of said display said adder providing the sum of the addresses stored in said storage means and said offset.

9. The apparatus defined by claim 8 wherein said offset is a function of the number of bits of pixel data used for each scan line.

10. The apparatus defined by claim 9 wherein said certain count is programmable.

11. In a video apparatus for providing video data for a display when said apparatus is coupled to a computer which includes a central processing unit and a main memory, an improvement comprising:

a plurality of video random-access memories each of which includes a memory array which is addressed by a row address and a shift register which is addressed by a column address;

addressing means for providing said row address and column address for transfer of said video data directly from said memory array to said shift register;

detection means for providing a first signal prior to the end of the shifting of the data from said shift registers, said first signal initiating a time sequence for transfer of said video data from said memory arrays directly to said shift registers in said video random-access memories, thereby permitting either a non-integer or integer number of scan lines per row of said memory array, said detection means provides said first signal when said shift register has a certain number of bits of data remaining and said certain number of bit is programmable; and control means for providing second signals to said video random-access memories when said first signal is received from said detection means;

said video random-access memories being addressed by said addressing means.

12. The improvement defined by claim 11 wherein said addressing means comprises:
  (a) row address storage means for storing said row address;
  (b) column address storage means for storing said column address;
  (c) a row counter coupled to receive said row address;
  (d) a column counter coupled to receive said column address;
  (d) said control means including means for causing said row counter to increment when said column counter reaches a predetermined count;
  (f) said detection means being coupled to said column counter.

* * * * *